United States Patent
Johansson et al.

(10) Patent No.: US 11,210,135 B2
(45) Date of Patent: Dec. 28, 2021

(54) LIGHTWEIGHT DISPATCHER FOR PROGRAM CONTROL FLOW FLATTENING

(71) Applicant: Telefonaktiebolaget LM Ericsson (publ), Stockholm (SE)

(72) Inventors: Björn Johansson, Bjärred (SE); Patrik Lantz, Dalby (SE); Michael Liljenstam, Sunnyvale, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 217 days.

(21) Appl. No.: 16/618,273

(22) PCT Filed: May 29, 2018

(86) PCT No.: PCT/EP2018/064043
§ 371 (c)(1),
(2) Date: Nov. 29, 2019

(87) PCT Pub. No.: WO2018/219933
PCT Pub. Date: Dec. 6, 2018

(65) Prior Publication Data
US 2020/0151007 A1    May 14, 2020

Related U.S. Application Data

(60) Provisional application No. 62/513,472, filed on Jun. 1, 2017.

(51) Int. Cl.
*G06F 9/48* (2006.01)
*G06F 9/30* (2018.01)
(Continued)

(52) U.S. Cl.
CPC .......... *G06F 9/4881* (2013.01); *G06F 9/3001* (2013.01); *G06F 9/30029* (2013.01); *G06F 9/3857* (2013.01); *G06F 21/14* (2013.01)

(58) Field of Classification Search
CPC .. G06F 9/4881; G06F 9/30029; G06F 9/3857; G06F 21/14
(Continued)

(56) References Cited

U.S. PATENT DOCUMENTS

2003/0093685 A1*  5/2003  Tobin ............... G06F 21/126
                                                    713/190
2008/0040593 A1*  2/2008  Kaabouch ........... G06F 21/77
                                                    712/244
(Continued)

FOREIGN PATENT DOCUMENTS

EP          3057021 A1    8/2016
WO    WO 2018/050335 A1   3/2018

OTHER PUBLICATIONS

International Search Report and Written Opinion of the International Searching Authority, PCT/EP2018/064043, dated Dec. 6, 2018, 9 pages.
(Continued)

*Primary Examiner* — Michael S McNally
(74) *Attorney, Agent, or Firm* — Sage Patent Group

(57) ABSTRACT

A method to obscure a control execution flow in a computer program includes initializing a state variable, q, and a switching variable, selecting a code block for execution using a present value of the switching variable, executing the code block, updating the state variable based on a present value of the state variable and a block-dependent constant that is associated with the code block to generate an updated state variable, and by applying a state update function to the updated state variable, and updating the switching variable by processing the state variable through a non-injective
(Continued)

output function that generates a new value of the switching variable based on the state variable. The operations of selecting the code block, executing the code block, updating the state variable and updating the switching variable are repeated to control execution flow.

22 Claims, 14 Drawing Sheets

(51) Int. Cl.
  *G06F 9/38* (2018.01)
  *G06F 21/14* (2013.01)
(58) Field of Classification Search
  USPC .......................................................... 726/26
  See application file for complete search history.

(56) References Cited

U.S. PATENT DOCUMENTS

| | | | |
|---|---|---|---|
| 2010/0226494 A1* | 9/2010 | Lynch | G06F 21/10 380/28 |
| 2019/0243952 A1* | 8/2019 | Dekker | G06F 30/30 |

OTHER PUBLICATIONS

Chow, Stanley et al., "An Approach to the Obfuscation of Control-Flow of Sequential Computer Programs," 4th International Conference, Information Security Conference (ISC 2001, LNCS 2200), Oct. 1-3, 2001, 12 pages.

Wang, Chenxi, et al., "Software Tamper Resistance: Obstructing Static Analysis of Programs," Jun. 30, 2000, 18 pages.

Junod, Pascal, et al., "Obfuscator-LLVM—Software Protection for the Masses," IEEE/ACM 1st International Workshop in Software Protection (SPRO) 2015, May 19, 2015, 7 pages.

Cappaert, Jan, et al., "A General Model for Hiding Control Flow," 10th Annual ACM Workshop on Digital Rights Management (DRM '10), Oct. 4, 2010, 9 pages.

Klimov, Alexander, et al., "A New Class of Invertible Mappings," Workshop on Cryptographic Hardware and Embedded Systems 2002 (CHES 2002, LNCS 2523), Aug. 15, 2002, 14 pages.

László, T., et al., "Obfuscating C++ Programs Via Control Flow Flattening," Annales Univ. Sci. Budapest, Sect. Comp. 30 (2009) 3-19, Aug. 2009, 18 pages.

Cappaert, Jan, et al., "Code Obfuscation Techniques for Software Protection," Arenberg Doctoral School of Science, Engineering & Technology, Dissertation, Apr. 2012, 129 pages.

\* cited by examiner

Providing an empty code block that is devoid of program code
342

FIG. 12

Providing a dummy code block that is devoid of functional program code
352

FIG. 13

LIGHTWEIGHT DISPATCHER FOR PROGRAM CONTROL FLOW FLATTENING

CROSS REFERENCE TO RELATED APPLICATIONS

This application is a 35 U.S.C. § 371 national stage application of PCT International Application No. PCT/EP2018/064043 filed on May 29, 2018, which in turn claims domestic priority to U.S. Provisional Patent Application No. 62/513,472 filed on Jun. 1, 2017, the disclosures and content of which are incorporated by reference herein in their entirety.

TECHNICAL FIELD

The present disclosure relates to methods and operations by computers for obscuring control execution flow of code blocks of a computer program.

BACKGROUND

An important aspect of Digital Rights Management is the ability to prevent or hinder unauthorized access to content or illegal copying of content. A combination of techniques is employed to prevent such access or make such access more difficult. One such technique is code obfuscation which hinders reverse engineering of computer program code, modification of the computer program code, extraction of embedded keys from the computer program code, etc. Different aspects of the computer program code can be obfuscated, although the present disclosure is primarily directed to obfuscation of control execution flow through code blocks of a computer program.

The primary objective of obfuscation of control flow is to hide the program control flow from analysis. A known technique employed to perform obfuscation to hinder static analysis is control flow flattening, a concept that was first introduced in [1] and [2]. This amounts to breaking the computer program (source code) into many blocks, typically starting with all the basic code blocks, such as segments of sequential code that may end with, but do not contain, any transfer of control (jumps or calls) or conditional jumps. These basic code blocks may, optionally, be even further divided into further sub-blocks that will then also be basic code blocks. The resulting blocks should be randomly permuted, may be interspersed with segments of fake/dead code that will never be executed, and each resulting block is, in effect, turned into a small function with whatever bridging code needed to tie the blocks back together to provide a defined execution flow when the code blocks are executed by a computer. The sequencing and calling of the code blocks for program execution is performed by a function termed the dispatcher, which will, thus, encode the proper sequence of execution flow through the code blocks.

SUMMARY

Some embodiments of the present disclosure are directed to a method by a computer to obscure a control execution flow through a plurality of code blocks of a computer program, the method includes initializing a state variable, q, and a switching variable, swVar, selecting a code block for execution from among a set of code blocks using a present value of the switching variable, executing the code block, updating the state variable based on a present value of the state variable and a block-dependent constant, a_i, that is associated with the code block to generate an updated state variable, and by applying a state update function, g(q), to the updated state variable, and updating the switching variable by processing the state variable through an output function, wherein the output function comprises a non-injective function that generates a new value of the switching variable based on the state variable. The operations of selecting the code block, executing the code block, updating the state variable and updating the switching variable are repeated to control execution flow through at least a plurality of code blocks among the set of code blocks.

A potential advantage of these embodiments is that the execution flow through the code blocks is highly obscured and attempts to reverse engineering operation of the computer program may be hindered. During execution of each of the code blocks, the operations for updating the state variable and then processing the updated state variable through the output function to generate the switch value, makes it very difficult if not impossible to predict which code block should be executed next and to determine which code block was previously executed.

In addition, these embodiments may also be performed with minimal execution time overhead while still providing good protection of the control flow structure of the program. Some embodiments may also avoid or reduce the need for a secret key to protect against static attacks.

Further embodiments provide a method by a code obscuring computer to obscure a control execution flow through a computer program. The method includes dividing a functional portion of the computer program into a set of code blocks, wherein each of the code blocks may end with, but does not otherwise contain, a transfer of control statement, providing a selection block that selects a code block for execution from among the set of code blocks using a present value of a switching variable, swVar, modifying each of the code blocks to update a state variable, q, based on a present value of the state variable and a block-dependent constant, a_i, that is associated with the code block, providing a state update function, g(q), that updates the state variable to provide an updated state variable, and providing a dispatcher block that is configured to receive control from each of the plurality of code blocks, wherein the dispatcher block is configured to update the switching variable by applying an output function, f(q), to the updated state variable, wherein the output function comprises a non-injective function that generates a value of the switching variable based on the updated state variable, and wherein the dispatcher block is configured to transfer control to the selection block.

BRIEF DESCRIPTION OF THE DRAWINGS

Aspects of the present disclosure are illustrated by way of example and are not limited by the accompanying drawings. In the drawings:

FIGS. 12 and 13 are flowcharts of operations according to further embodiments.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment. Any two or more embodiments described below may be combined in any way with each other.

Various embodiments of the present disclosure are directed to a method of control flow obfuscation. Some embodiments described herein employ control flow flattening for code obfuscation.

Figure 1:
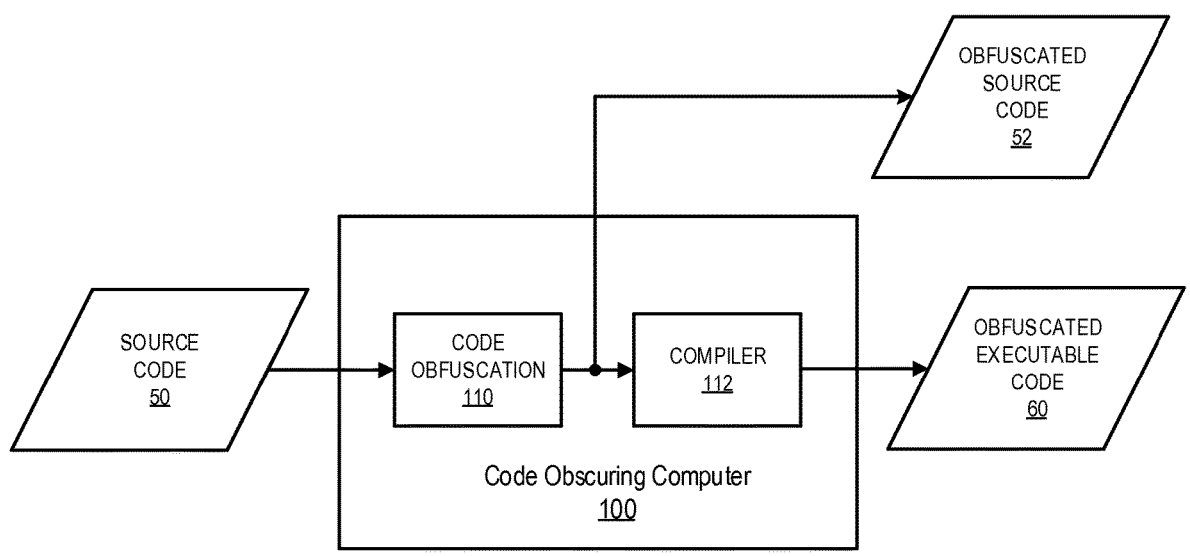
FIG. 1 illustrates a code obscuring computer that performs code obfuscation operations during compilation of source code and/or during transformation of source code.

FIG. 1 illustrates a code obscuring computer 100 according to some embodiments that performs code obfuscation operations during compilation of source code to output executable code or transformation of source code to transformed source code that is then compiled to output executable code. The code obfuscation computer 100 receives source code 50. The source code 50 is provided to a code obfuscation module 110 in the code obfuscation computer 100. The code obfuscation module 110 performs code obfuscation on the source code 50 to generate obfuscated source code 52. The obfuscated source code 52 output by the code obfuscation module 110 is then compiled by a compilation module, or compiler 112. For example, if the target is obfuscated source code, code obfuscation may be performed using a source to source translation. An example of this may be to obfuscate JavaScript code that is executed in a web browser.

Although illustrated in FIG. 1 as separate functions, the process of code obfuscation could be performed entirely in the compiler 112; that is, the functions of the code obfuscation module 110 and the compiler 112 may be merged into a single functional module in the code obscuring computer 100. In some embodiments, the obfuscated source code may be output by the code obscuring computer 100 without compilation. For example, the obfuscated source code 52 may be stored and/or transmitted to be compiled on a different computer than the code obscuring computer 100. Moreover, it will be appreciated that it may be possible to generate obfuscated executable code without first generating obfuscated source code. Thus, the order of blocks 110 and 112 in FIG. 1 may be reversed in some implementations so that code obfuscation occurs after compilation.

For example, in some embodiments, a compiler may be used to compile source code to an intermediate representation, and the code obfuscation module 110 may operate on the intermediate representation to change it into obfuscated intermediate representation which is then compiled to executable code.

Source code, intermediate code and executable code are generally referred to herein as "program code."

Control flow flattening obfuscation transforms sequential code blocks into a flattened structure, which can be a switch loop structure where each case statement represents a different one of the code blocks. In each code block the variable in the switch expression is updated to transfer execution flow to the next code block accordingly to the defined sequential structure. The last code block ends the switch loop by a return statement.

Figure 2A:
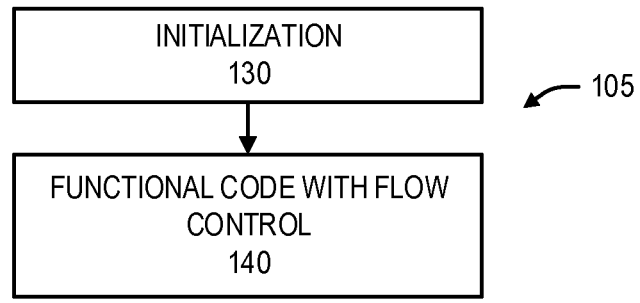
FIGS. 2A and 2B illustrated code flattening for a simple computer program.
Figure 2B:
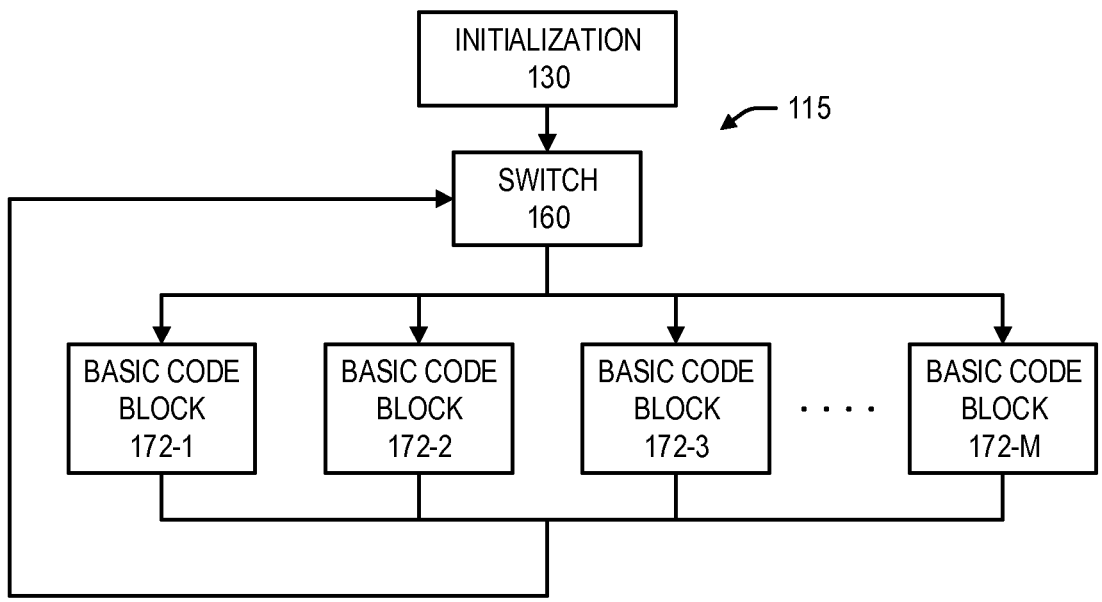

FIGS. 2A and 2B generally illustrate control flow flattening at a high level. FIG. 2A illustrates operations 105 of a non-flattened computer program. In general, the operations include an initialization step, module or routine 130 in which initial values of various parameters are set followed by a step, module or routine including functional code 140. The functional code 140 may include various types of program flow control, including conditional or unconditional branches, jumps and similar operations.

Referring to FIG. 2B, the functional program code 140 of FIG. 2A may be transformed into flattened code 115 by dividing the functional code into a plurality of basic code blocks in the form of functional sub-blocks 172-1 to 172-M. As noted above, each of the basic code blocks may end with, but not otherwise contain, any transfer of control (jumps or calls) or conditional jumps. After the initialization block 130, a switch block 160 selects a basic code block 172-1 to 172-M for execution based on the value of a switching variable (e.g., swVar). The value of the switching variable is updated in each of the basic code blocks, so that when the selected basic code block has finished execution and control returns to the switch block 160, the switch block 160 can select the next basic code block for execution based on the updated value of the switching variable.

Figure 3A:
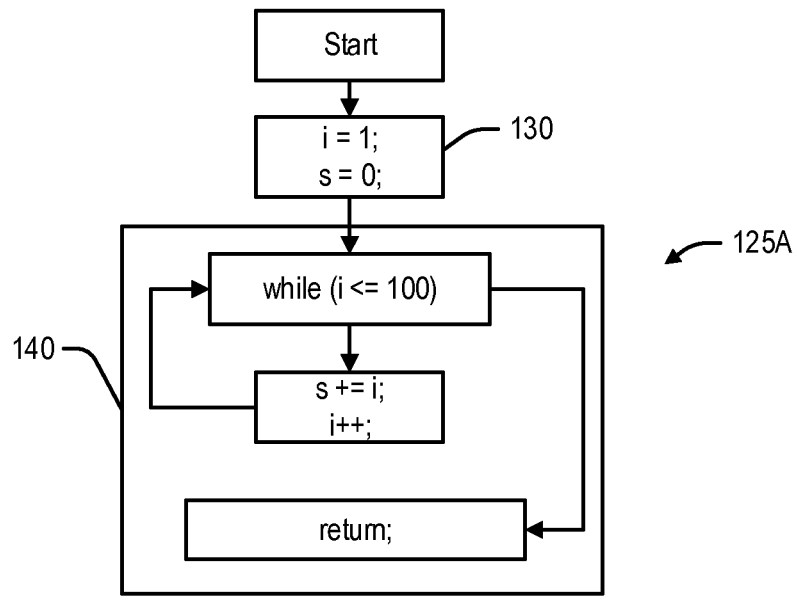
FIGS. 3A and 3B show an example operation of code flattening for a simple computer program.
Figure 3B:
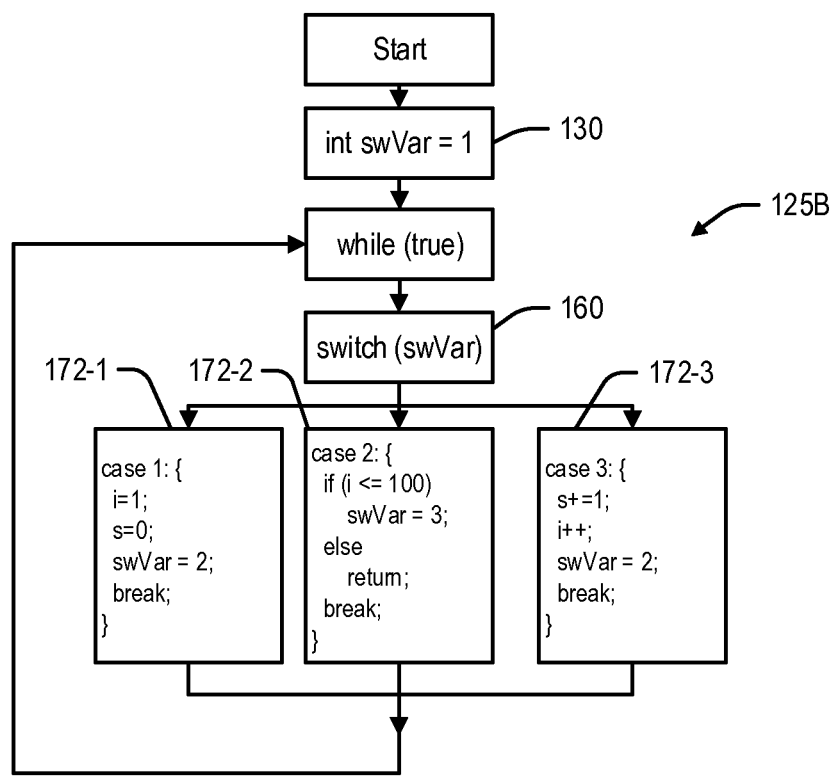

FIGS. 3A and 3B show an example operation of code flattening for a simple computer program. FIG. 3A shows the original program 125A that updates the value of a variable, s, in a loop controlled by a loop index, i. FIG. 3B shows the flattened version 125B after control flow flattening obfuscation has been performed to generate a plurality of code blocks 172-1 to 172-3 (i.e., "case 1", "case 2", "case 3") from the original program. The basic code blocks have been broken into separate functions that update a switch variable swVar, and a switch block 160 calls the basic blocks in sequence according to the original code. The switch block 160 includes the switch function, e.g., "switch(swVar)", that selects among the code blocks based on the switch variable swVar which is updated during execution of each of the basic code blocks to point to the next code block to be selected by the switch block 160.

Figure 4A:
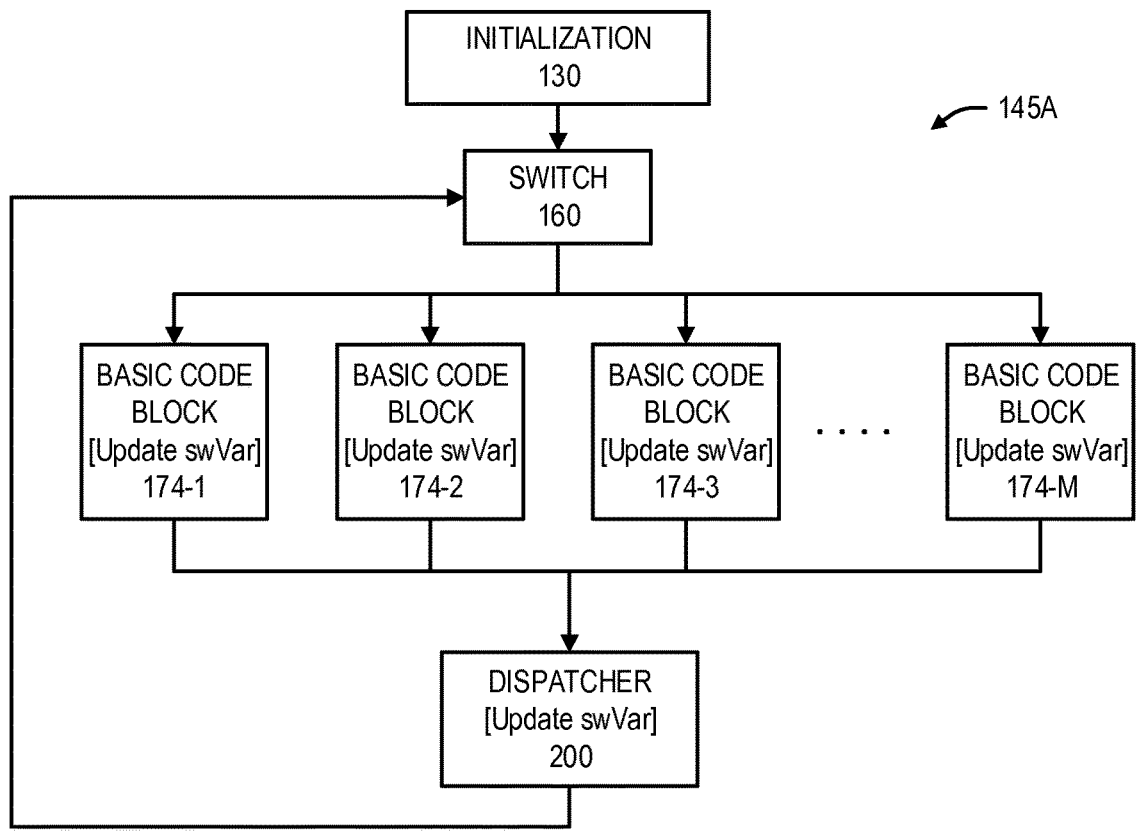
FIGS. 4A and 4B illustrate flattened code including an output function that updates a switching variable.
Figure 4B:
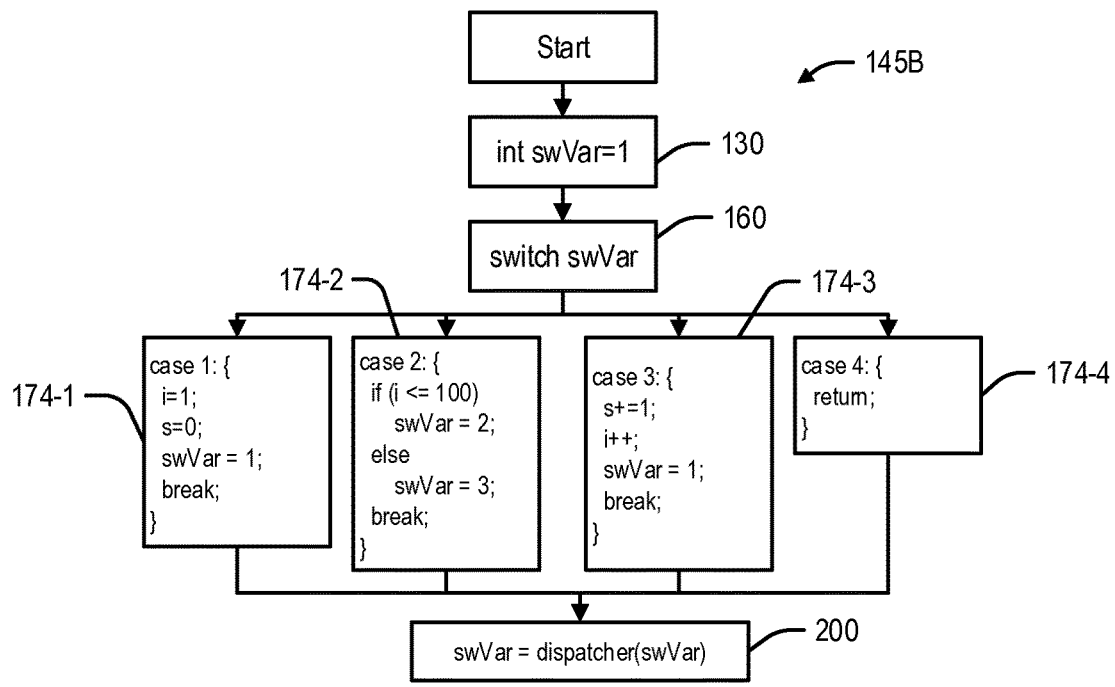

FIGS. 4A and 4B illustrate code flattening using an output function. In particular, FIG. 4A illustrates operations 145A of a flattened computer program including a switch block 160 that selects one of a plurality of code blocks 174-1 to 174-M for execution based on the value of the switching variable swVar. Each of the code blocks 174-1 to 174-M may update the switching variable swVar during execution. A dispatching function, or dispatcher, 200, receives control after execution of each of the code blocks and updates the switching variable according to an output function, and then returns control to the switch block 160.

FIG. 4B illustrates an example 145B of the flattened code shown in FIG. 4A. In particular, after the initialization block 130 initializes the value of swVar, the switch 160 selects a code block 174-1 to 174-4 for execution based on the value of swVar. Each of the code blocks 174-1 to 174-3 updates the value of swVar during execution, while code block 174-4 performs no operations.

After execution by the code blocks, control is passed to the dispatcher 200, which updates the switching variable swVar according to an output function, e.g., "dispatcher (swVar)," and then returns control to switch block 160.

In this manner, for instance, loading compiled code into a disassembler that provides visualization through static analysis in the form of a control flow graph will not reveal the actual flow of control between the many pieces or what code may in fact be dead code. However, the obfuscation of control flow clearly still hinges upon it not being readily evident from the output function how the pieces are tied together during execution.

In the work by Wang et al. [1] and Chow et al. [2], the program is first transformed through control flow flattening, then additional measures were taken to make it difficult to determine the execution order of the basic blocks. Wang et al. based their approach on the use of pointers to determine indirect branch targets, and known NP-completeness results to determine aliasing of such pointers. Thus, through a reduction they show that branch target determination becomes an NP-complete problem. Chow et al., on the other hand, described a method for embedding a problem into the dispatcher function that controls the execution order of the flattened code blocks. Note that in [1], the authors define the dispatcher function as all the code necessary to determine the block sequence and switch between the blocks. Some embodiments described herein have separated out the switch statement from the dispatcher, which then contains the state update function and translation from state to switching variable as illustrated, for example, in FIG. 8B. By embedding a mechanism in such a way that finding a certain property of the mechanism is linked to a goal in deobfuscating the code, they provide a complexity-theoretic argument for the difficulty of the deobfuscation goal. Specifically, they embed a Linear Bounded Automaton (LBA), in the paper called a Linear Bounded Turing Machine, and reduce the acceptance problem of the LBA, to the problem of determining if a given code block will be executed or is dead code. In this manner, detection of dead code blocks is shown to be as hard as the LBA acceptance problem, a problem known to be PSPACE-complete. However, it has been mentioned that the guarantees thus provided are not quite what they seem, as we do not have average-case hard instance generators for NP-complete or PSPACE-complete problems.

In [3], an algorithm for flattening of C++ code is presented, but it does not address how to make the output function difficult to analyze. In [4] a cryptographic hash function is provided. A number of commercial and open source tools exist for code obfuscation, many of which perform some kind of control flow flattening. An open source example is the Obfuscator-LLVM tool [5].

The article in [6], which is a publication by the present inventors, describes an approach to balance security and performance requirements using light weight functions and secret keys in the output function and basic blocks. The present inventive concepts represent a further refinement on that approach.

Various embodiments disclosed herein use a computationally efficient function or set of computationally efficient functions to encode a program state variable into a switching variable that is used to control selection of a next code block from among a set of code blocks of a computer program. In addition, the program state is updated in each of the code blocks by adding a block-dependent constant to the program state variable before the program state variable is encoded.

Some embodiments provide a flattening construction and performance efficient dispatchers that provide good protection against static analysis of the control flow of a program without imposing a high runtime performance overhead. In this model the requirements on the output function is similar to the requirements on a stream cipher, making modified stream ciphers good candidates for the dispatchers.

Dispatchers that Process State Variables

Figure 5A:
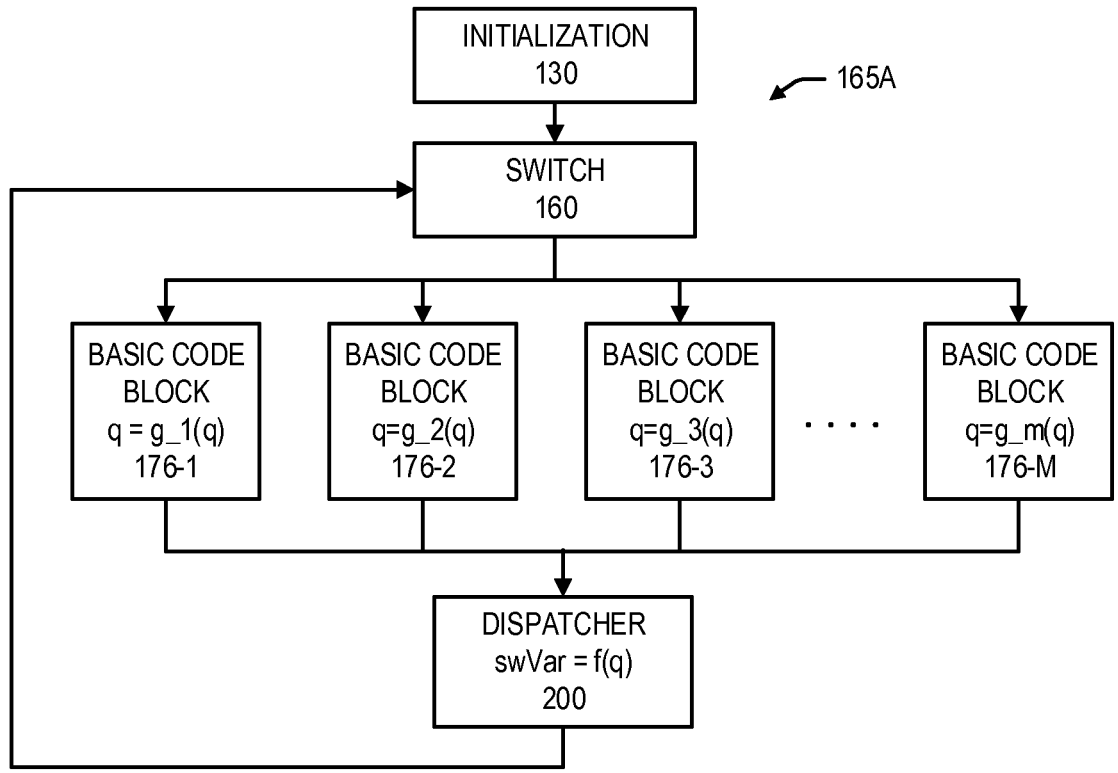
FIGS. 5A and 5B illustrate flattened code including an output function that updates a switching variable based on a state variable that is updated within basic code blocks.

FIG. 5A illustrates a flattened code structure 165A including an initialization block 130, a switch block 160, a plurality of basic code blocks 176-1 to 176-M and a dispatcher 200. In each iteration of the loop, the switch block 160 selects one of the basic code blocks 176-1 to 176-M for execution based on the value of a switching variable, swVar. The code structure 165A uses a state variable, q, to track a current state of the code. The basic code blocks 176-1 to 176-M update the state variable q during execution using a block-specific state update function $g\_i(q)$, and the dispatcher 200 generates a new value of the switching variable swVar based on the value of the state variable q using an output function $f(q)$ before returning control to the switch block 160.

Figure 5B:
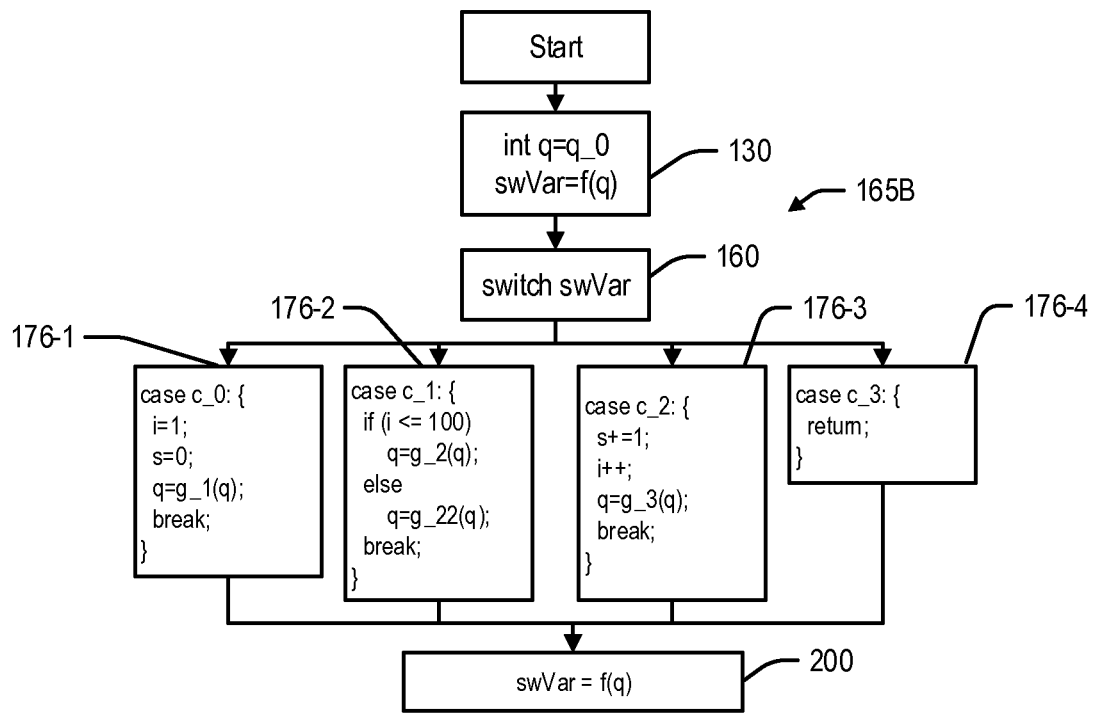

FIG. 5B is an example of a flattened code structure 165B that uses a state variable q. In the code structure 165B, the switching variable swVar and the state variable q are initialized in block 130. The switching variable swVar can take one of at least four possible values, $c\_0$ to $c\_3$. Each of the basic code blocks 176-1 to 176-3 updates the state variable q using a block-specific state update function $g\_i(q)$. The dispatcher 200 generates a new value of the switching variable swVar based on the value of the state variable q using an output function $f(q)$ before returning control to the switch block 160.

Flattening Construction Model

Figure 6A:
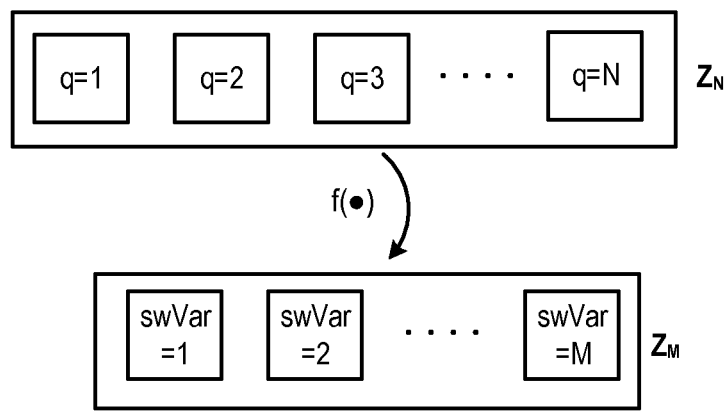
FIGS. 6A and 6B illustrate mapping from an internal state variable to a switching variable.
Figure 6B:
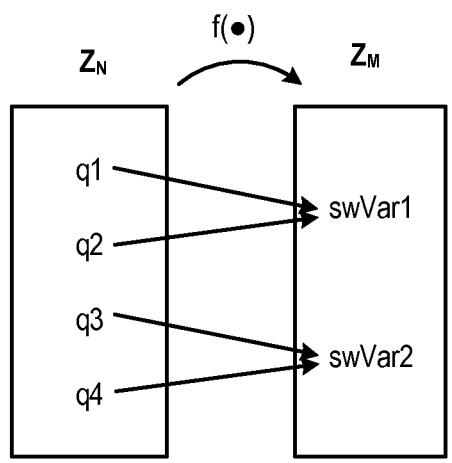

Following is a mathematical model that will be used to present and analyze various embodiments of code obfuscation herein. A computer program may be divided into M basic code blocks. An output function f( ) is defined as a function $f:Z_N \to Z_M$ where N is much larger than M and f has collisions, i.e. many preimages to each value in $Z_M$. There is further defined a state $q \in Z_N$ and a switching variable swVar $\in Z_M$. The switching variable is the output of the output function evaluated on the state, swVar=f(q). This variable determines the next block to execute. That is, the output function f( ) maps N possible values of the state variable q onto M values of the switching variable swVar, where N>M. This is illustrated, for example, in FIG. 6A. Because the output function f( ) can map multiple values of the state variable q onto a single value of the switching variable swVar, the output function f( ) is referred to as a non-injective function. Moreover, because the domain $Z_N$ has many preimages to each value in $Z_M$, several values of the state variable q map to each value of the switching variable swVar, as illustrated in FIG. 6B.

There is also defined one or more state update functions $g_i:Z_N \rightarrow Z_N$ that update the state in a block to a state that the output function evaluates to obtain the case value (i.e., the value of the switching variable swVar that is input to a switch/case statement using the C programming language as an example) the for the succeeding block, e.g. f(g_1(q_0))=c_1 (see, e.g., FIG. 5B). Here, c_i are constants in the case expressions in the code identifying a block B_i in the code.

Figure 7A:
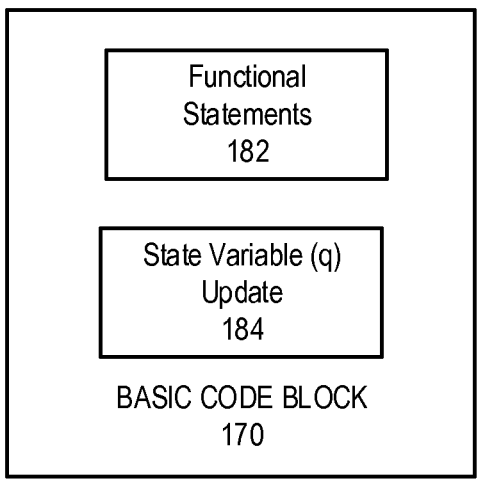
FIG. 7A illustrates aspects of a basic code block according to some embodiments.

Referring to FIG. 7A, a basic code block 170 may include a functional block 182 including functional statements, e.g., program statements that execute the logic of the original computer program, and a state variable update block 184 that is inserted into the basic code block 170 by the code obfuscation block 110 of the code obscuring computer 100 (FIG. 1). The state variable update block 184 may apply a block-dependent state update function g_i( ) to the state variable q to generate a new value of the state variable q.

Figure 7B:
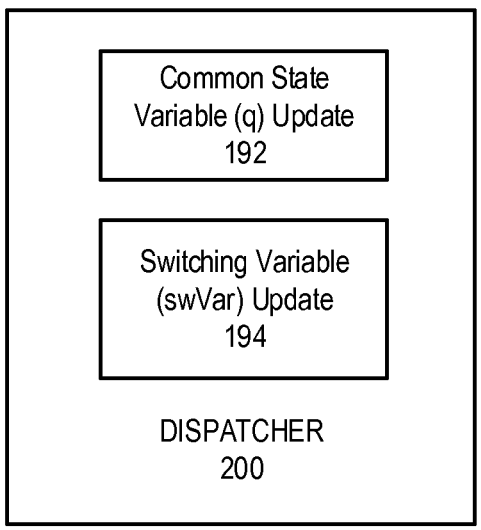
FIG. 7B illustrates aspects of a dispatcher block according to some embodiments.

Referring to FIG. 7B, the dispatcher 200 may include a common state variable update block 192 (as described in more detail below) and a switching variable update block (194) that applies the output function f( ) to obtain a new value of the switching variable swVar.

In the following description, all arithmetic operations (addition, multiplication, etc.) are modulo-$2^n$ operations (i.e., only the n least significant bits are kept after the operation).

Figure 8A:
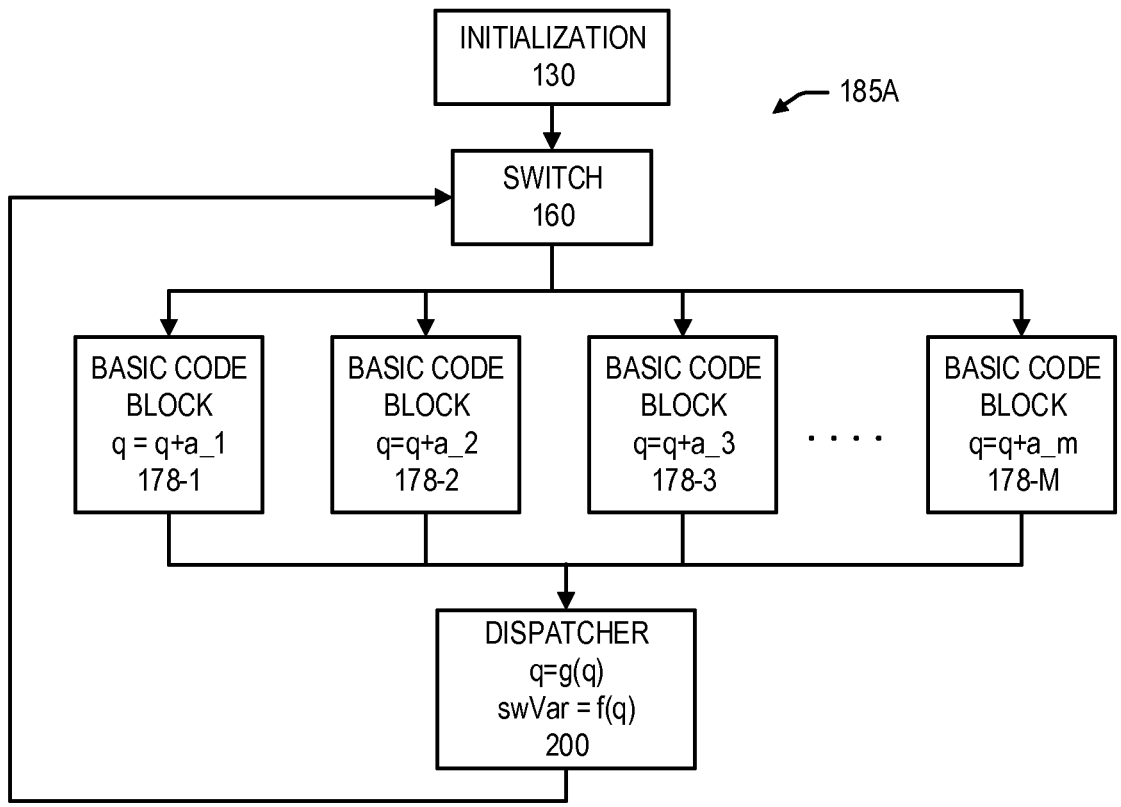
FIGS. 8A and 8B illustrate flattened code including an output function that updates a state variable and updates a switching variable based on the updated state variable.
Figure 8B:
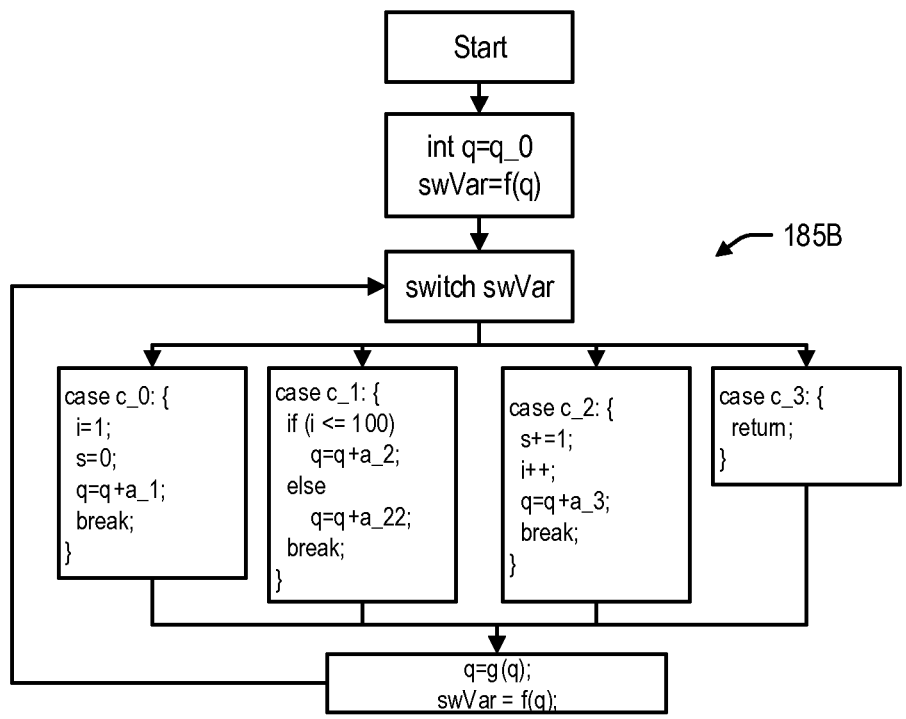

Referring to FIG. 8A, a flattened program code 185A is illustrated in which the state update is performed by the dispatcher 200 using a common update function go, with the basic code blocks 178-1 to 178-M performing simple/fast operations with block dependent constants a_i. For example, g_i may be defined as g_i(q)=g(q+a_i) or g_i(q)=g(q ⊕a_i). In such embodiments, the addition/XOR with the block dependent constant a_i may be performed in the basic code block 178, whereas the common state update function g( ) may be performed in the dispatcher block 200. FIG. 8B shows an example flow 185B of the approach illustrated in FIG. 8A. The aim of the construction is to keep the state value q for a particular basic code block B secret from the adversary, although unless it can be securely initialized at runtime the initial state value q_0 will be visible in the first block.

Attack Model

In order to capture the control-flow of a flattened computer program that uses a state variable, an attacker must determine the state q in a block. As the state is only visible at initialization and each output from f has multiple pre-images, it is not possible for an attacker to determine the succeeding or preceding block by analyzing only the case instructions and state updates.

Consider an attack where the adversary also knows a small sequence of succeeding basic blocks and tries to determine q. The constraints on the state q given by a sequence of k known succeeding basic blocks can be expressed as follows, assuming that the operation in the block is addition. Corresponding constraints could be expressed for other operations e.g. xor.

$$f(q) = c\_0$$
$$f(g(q + a\_1)) = c\_1$$
$$\ldots$$
$$f(g(\ldots g(g(q + a\_1) + a\_2) \ldots) + a\_\{k-1\}) = c\_\{k-1\},$$

where $\{c\_0, c\_1, \ldots, c\_{k-1}\}$ is the known sequence of case instructions corresponding to the known sequence of blocks, and a_i is the block dependent constant used to route the execution correct.

The objective is now to find a non-injective output function f( ) and state update function g( ) that are performance efficient but that still make it hard to solve the constraints above or determine the state q in any other way.

Note the relation to constructing a cryptographic pseudo-random number generator, CPRNG, or a stream cipher. The attack model is almost identical: determine state and previous or next output by observing a number of outputs in a sequence. However, the code obfuscastion application has a more difficult performance requirement on the dispatcher and the adversary is expected to know only a limited number of blocks in a sequence corresponding to a limited number of outputs.

Output Functions

The described method leverages constructs similar to those found in certain stream ciphers, in order to find computationally efficient, "light weight", constructs that still provide sufficiently good security properties. Specifically, we focus on T-functions.

Various dispatchers to be used in a flattening construction according to some embodiments will now be described. The dispatchers described below have different performance vs protection profiles.

Lightweight Stream-Ciphers

Using the output function and state update function from a conventional stream cipher, e.g. RC4, in the dispatcher in our construction would be the best option for protection as these ciphers have been analyzed in depth for a similar attack model. There are various lightweight stream ciphers optimized for performance but all introduce performance overhead that might be too high for many applications.

HW Supported Dispatcher and Intel AVX

Advanced Vector Extensions (AVX) are extensions to the x86 instruction set architecture for microprocessors. It provides HW support for certain cryptographic operations. For example, there is an instruction for running one round in 128 bit AES very fast. By using the state q as both the 128 bit key and the 128 bit plain text in the aes instruction we may define a dispatcher according to:

$$g(q) = \text{one\_round\_aes}(q,q) \quad (1)$$

$$f(q) = q \gg (128-m) \quad (2)$$

In some embodiments, the single round of AES may be called with two parameters, key, k, and plaintext, p, where both are functions of q, i.e., $k=f_k(q)$ and $p=f_p(q)$ where $f_k$ and $f_p$ could be, for example, identity, taking a part of the input (e.g., each take half), some transformation of q, or some other function.

Here m is the number of bits in swVar and >> denotes right shift. Hence f outputs the m most significant bits of q.

This dispatcher provides good performance but not great protection as one round of AES can easily be broken if sufficient information is available.

Background on T-Functions

Klimov and Shamir [7] introduced a T-function with only 3 operations as an alternative for using Linear Feedback Shift Registers (LFSR) in Pseudo Random Number Generator (PRNG) constructions. The T-function is defined by:

$$x \rightarrow x+x^2 \text{ OR } C (\bmod\ 2^n) \quad (3)$$

where C=5,7 (mod 8) and the square is defined by arithmetic multiplication. There are no non-linear invertible mappings with a single cycle that has fewer operations.

The T-function of Eq. (3) has been shown to have weaknesses when used as a stream cipher that can be exploited in certain attacks. A main issue is that the state is only the word size of the processor architecture, typically 32 or 64 bits. To deal with this issue, multi-word T-functions have been suggested using the following construction to create a larger state size:

$$x \rightarrow x+x^2 \text{ OR } C_k \quad (4)$$

$$k \rightarrow k+1 \bmod m \quad (5)$$

This construction provides a sequence (x_i,k_i) with maximal period (m2$^n$) if and only if m is odd and for all k, $[C_k]_0=1$ and $\oplus_{k=0}^{k=m-1}[C_k]=1$.

Klimov and Shamir (K-S) T-Function

The known weakness of the K-S T-function is not applicable for our attack scenario where only a limited sequence of succeeding blocks is known. Therefore a construction similar to K-S T-function is first considered for the dispatcher. As one 64 bit state variable is too small for a brute force attack, two concatenated 64 bit variables may be used to define the state $q=\{q_1|q_2\}$. Note that the state index now identifies one of the 64 bit state variables.

Let the n-bit state variables $q_1$, $q_2$ be updated in basic blocks by $q_i=q_i+a_i$ (or $q_i=q_i \oplus a_i$) and define the update function g and output function f by $$g(\{q_1|q_2\}) = \{q_1+q_1^2 \text{ OR } q_2|q_2\} \quad (6)$$

$$f(\{q_1|q_2\}) = q_1 \gg (n-m) \quad (7)$$

Here the operator "|" denotes concatenation of the bit vectors and the operator ">>" denotes bitwise right shift. Note that $q_2$ is updated with an addition/xor in the basic block but for performance reasons it may not be updated in the state update function in the dispatcher.

Minimal T-Function

Unlike the case of a stream cipher we do not have to worry about having the single full cycle property. As we set the state (update to a particular state) in the basic block before the state is updated in the state update function every state may still be reached. Thus, as we seek a minimal function, we combine one operation performed on each of the two state variables in the basic blocks to route the execution correct, with one operation in the state update function and one operation (e.g. shift) performed in the output function to extract m out of n bits. For example, let the n-bit state variables $q_1,q_2$ be updated in basic blocks by $q_i=q_i+a_i$ (or $q_i=q_i \oplus a_i$) and define the update function g and output function f by $$g(\{q_1|q_2\}) = \{q_1 \cdot q_2|q_2\} \quad (8)$$

$$f(\{q_1|q_2\}) = q_1 \gg (n-m) \quad (9)$$

where · is the arithmetic multiplication modulo $2^n$ and the output function f is defined as the m most significant bits of $q_1$. This results in the use of a total of 4 operations. This single multiplication makes analysis complex for an attacker, whereas simpler operations (additions, binary, shift, rotate, etc) may not provide the required protection.

A corresponding construction with 3 n-bit state variables is the following. Let $q=\{q_1|q_2|q_3\}$ be the state variables and update q1 by xor and q2,q3 by varying xor and addition in the basic blocks. Let the update function g and output function f be defined by $$g(\{q_1|q_2|q_3\}) = \{(q_1+q_2) \cdot q_3|q_2|q_3\} \quad (10)$$

$$f(\{q_1q_2q_3\}) = q_1 \gg (n-m) \quad (11)$$

These minimal T-functions are most performance efficient and have shown to also provide good protection against solving the constraints from 5.2 even if the required information in available.

In order to optimize performance for the T-function based dispatchers the state variable $q_2$ is only updated in the basic block according to $q_0=q_2+a_i$; where i is a block identifier. This opens up the possibility of an attack where the adversary finds a set of blocks with state updates of $q_2$ that sum up to zero. There is a possibility that this set of blocks constitute a loop in the control flow graph. Such an attack may be mitigated by updating the state variables in the blocks using different operations. For example, addition or xor may be randomly chosen at compile time, making sure that each loop contains both types of updates.

It is possible to make analysis for an adversary harder by making small extensions to the approaches described above. In particular, with small extensions, the constraints on q may be made conditional and more information will be needed by an attacker.

Figure 9:
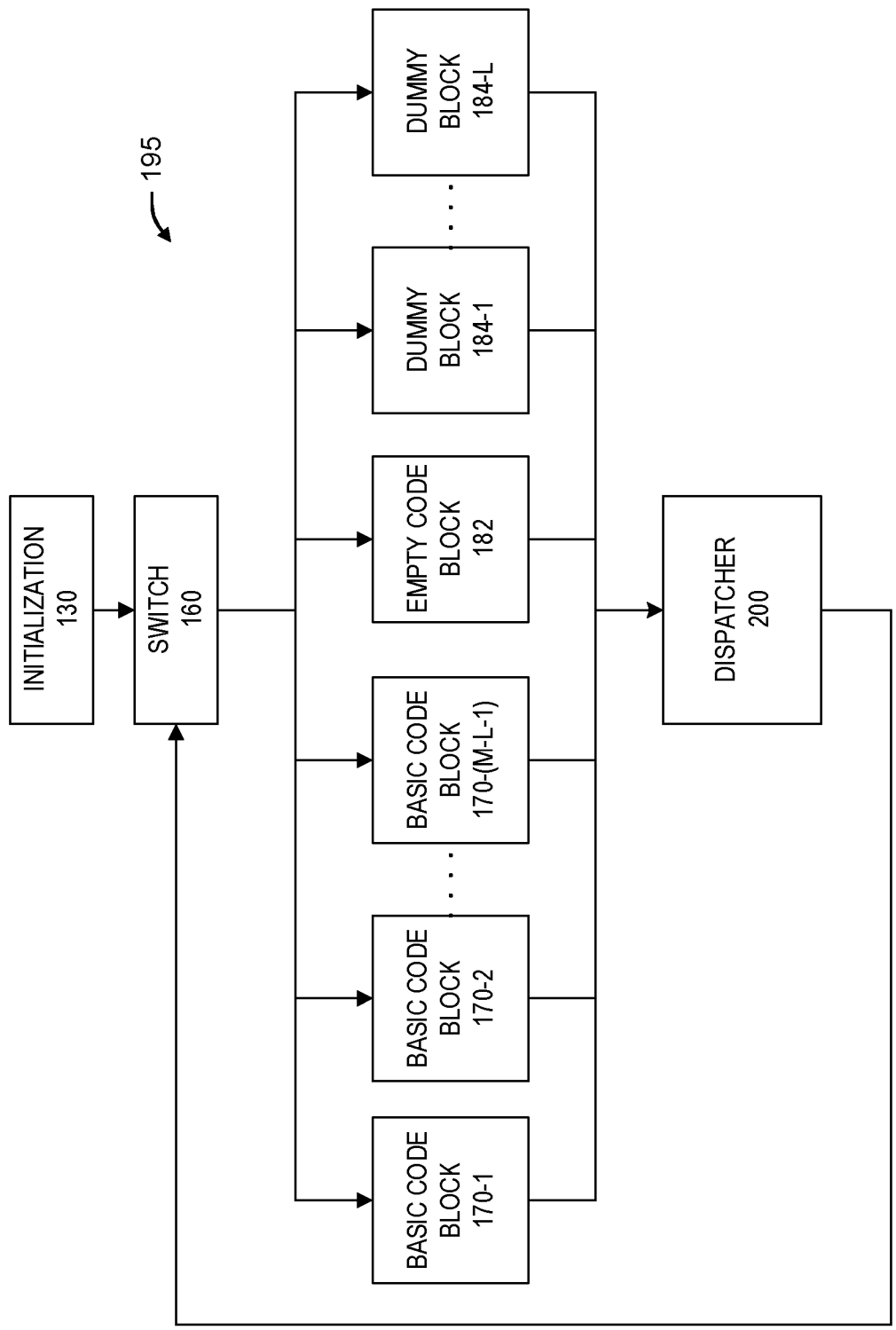
FIG. 9 illustrates flattened code including basic code blocks, empty code blocks and dummy blocks.

In some embodiments, after the first evaluation, the dispatcher may route the execution to an empty default block. Several evaluations of the dispatcher may be needed in order to reach the actual succeeding block. For example, FIG. 9 illustrates a flattened program structure 195 that includes empty code blocks 182-1 to 182-K that do not contain functional program code. An empty block may be associated, in a switching function executed by the switch block 160, with a default selection. For example, the switch block 160 may be coded to select the empty block if the switch variable swVar does not match the argument of any case statement in the switch function. FIG. 9 also illustrates dummy code blocks 184-1 to 184-L that correspond to values of the switching variable that are allowed, and that may be associated with case statements in the switch block 160, but that are never to be generated by the dispatcher 200. The dummy code blocks 184-1 to 184-L may contain non-functional decoy code.

In other embodiments, conditional branches may be introduced in blocks with unconditional jumps with constraints that cannot be fulfilled. Then, for an attacker that knows a succeeding block, there are two possible variable updates out of which only one is correct.

With these extensions to the construction the system of equation described above with respect to minimal T-functions will be more complex and may for example include either/or expressions. More information will be required for the system to be solvable by an attacker, and the complexity to find a solution will be higher.

Figure 10:
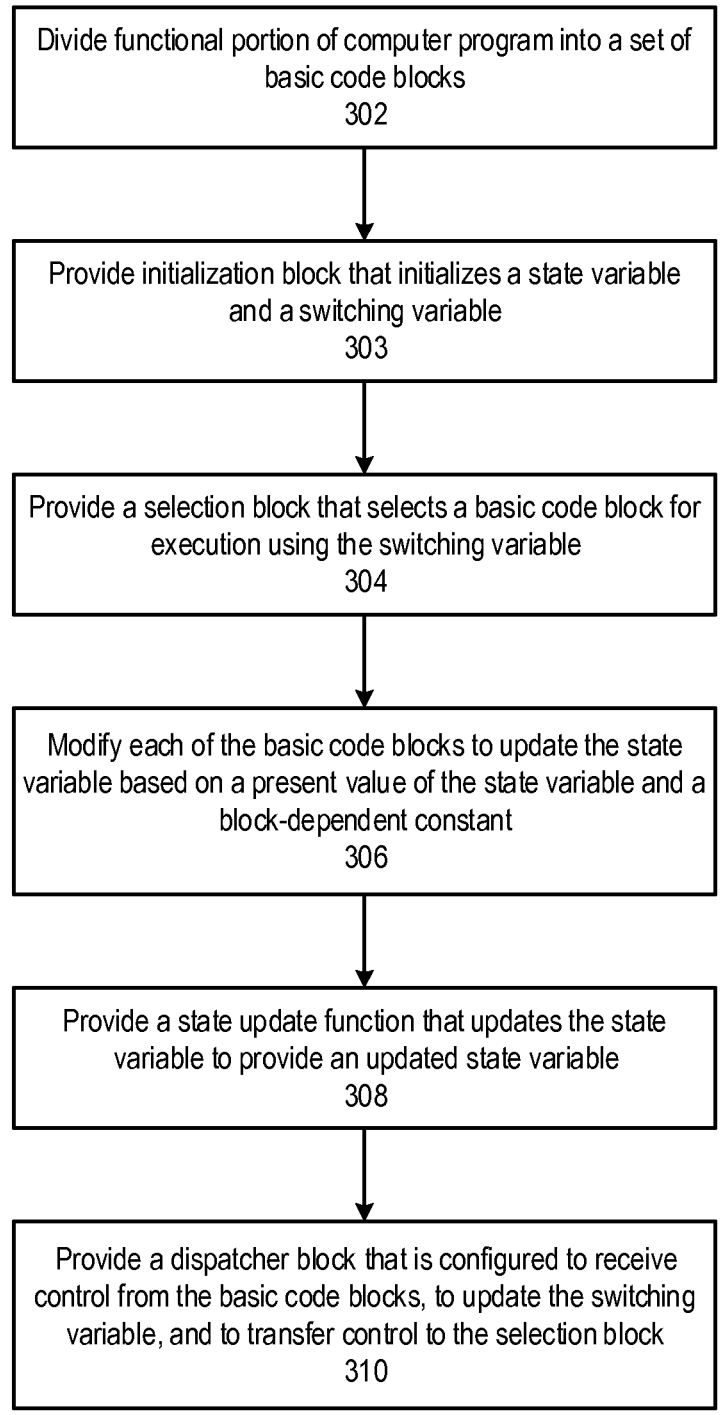
FIG. 10 is a flowchart of operations and methods that can be performed by a code obscuring computer to obscure a control execution flow through a computer program in accordance with some embodiments.

Example operations of a code obscuring computer 100 are illustrated in FIG. 10. Referring to FIG. 10, the operations include dividing a functional portion of the computer program into a set of basic code blocks, wherein each of the basic code blocks may end with, but does not otherwise contain, a transfer of control statement (block 302). An initialization block is provided (block 303) that initializes a value of a switching variable, swVar, and a state variable, q. The operations further include providing a selection block that selects a basic code block for execution from among the set of basic code blocks using a present value of the switching variable, swVar (block 304).

The method includes modifying each of the basic code blocks to update the state variable, q, based on a present value of the state variable and a block-dependent constant, a_i, that is associated with the basic code block (block 306), providing a state update function, g(q), that updates the state variable to provide an updated state variable (block 308), and providing a dispatcher block that is configured to receive control from each of the plurality of basic code blocks (block 310). In some embodiments, the state update function may be included in the dispatcher block. The dispatcher block is configured to update the switching variable by applying an output function, f(q), to the updated state variable. The output function includes a non-injective function that generates a value of the switching variable based on the updated state variable, and each possible switching variable value is associated with a plurality of state variable values. The dispatcher block is configured to transfer control to the selection block.

Figure 11:
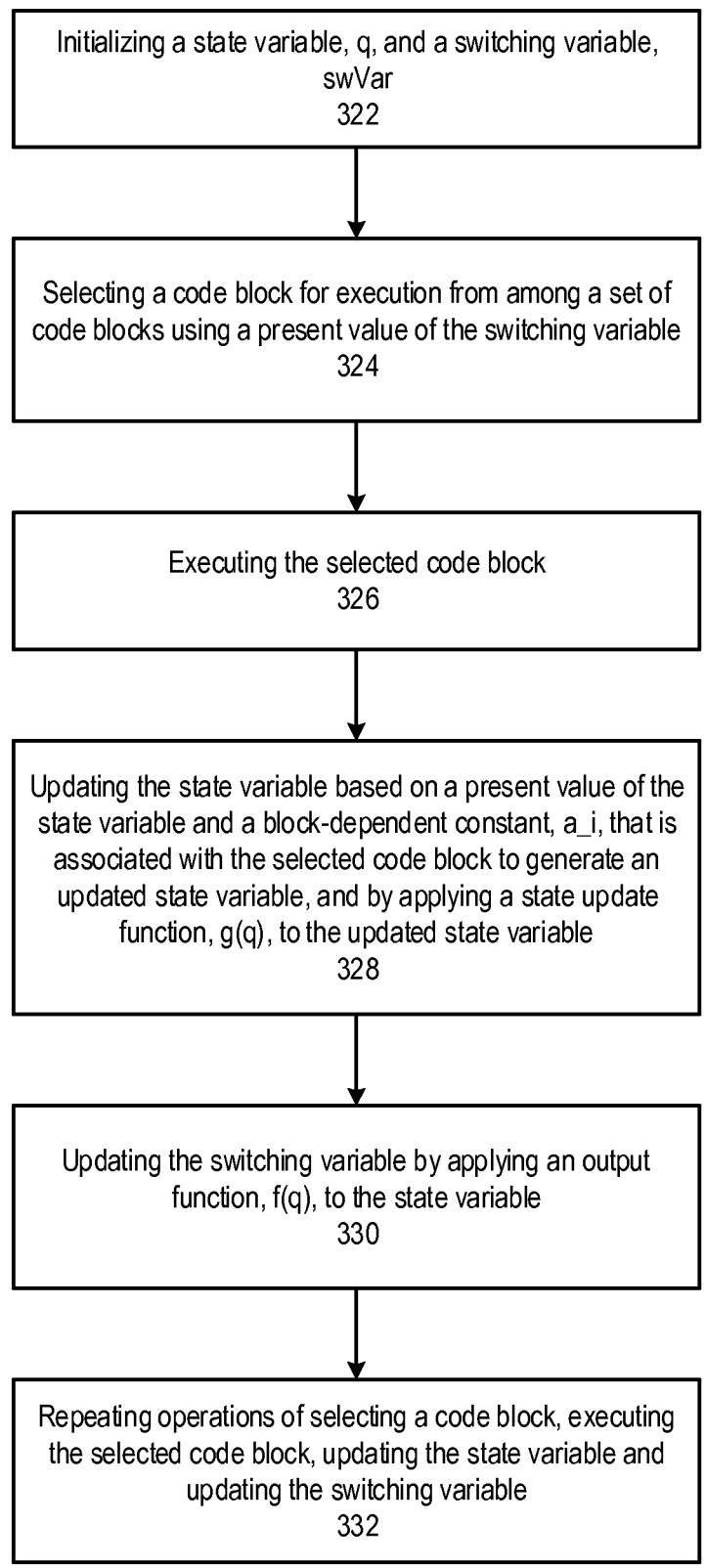
FIG. 11 is a flowchart of operations and methods of obscured code in accordance with some embodiments.

Example operations of a program that has been obscured by a code obscuring computer 100 according to some embodiments are illustrated in FIG. 11. The method includes initializing a state variable, q, and a switching variable, swVar (block 322). A code block is selected for execution from among a set of code blocks of the computer program using a present value of the switching variable (block 322), and the selected code block is executed (block 326).

The method further includes updating the state variable based on a present value of the state variable and a block-dependent constant, a_i, that is associated with the code block to generate an updated state variable, and by applying a state update function, g(q), to the updated state variable (block 328).

The switching variable is updated by applying an output function, f(q), to the state variable, wherein the output function includes a non-injective function that generates a value of the switching variable based on the state variable, and each possible switching variable value is associated with a plurality of state variable values (block 330).

The operations of selecting a code block, executing the selected code block, updating the state variable and updating the switching variable are repeated to control execution flow through the set of code blocks (block 332).

Referring to FIG. 12, some embodiments include providing an empty code block that is devoid of functional program code (block 342).

Referring to FIG. 13, some embodiments include providing a dummy code block that is devoid of functional program code (block 352), but that may include diversionary code that is never meant to be executed but that makes the program more difficult to reverse engineer.

Advantages

Operations and methods of the present disclosure may provide reductions in the processing overhead and memory storage requirements consumed to perform the operations and methods disclosed herein to obfuscate the control execution flow of a computer program, and may be at least as robust against attacks as previous approaches. Moreover protection against some dynamic analysis, specifically using symbolic execution, can be improved by making use of the dispatcher state which is dependent upon a secret key to complicate prediction of the previous state and next state.

Figure 14:
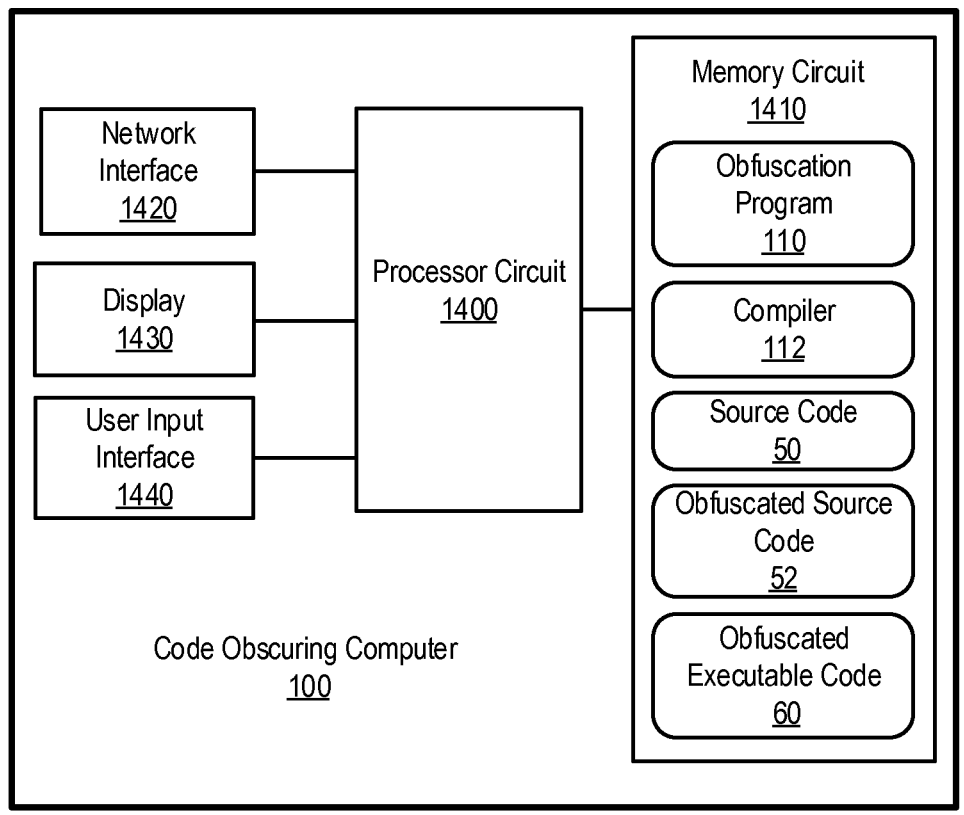
FIG. 14 is a block diagram of a code obscuring computer configured to perform operations in accordance with some embodiments.

FIG. 14 is a block diagram of a code obscuring computer 100 configured to perform operations according to one or more embodiments disclosed herein. The code obscuring computer 100 may be used to obscure the source code file of FIG. 1 during compilation of the source code to executable code, during source-to-source code transformation which may output the transformed source code or may then compile the transformed source code to executable code. Although various embodiments have been disclosed herein the context of processing source code, aspects of the present disclosure may also be used to process binary code, such as to perform binary-to-binary transformation that obscures the control flow therethrough.

The code obscuring computer 100 includes a processor circuit 1400 and a memory circuit 1410 containing obfuscation program code 110, and may further contain source code 50 of a computer program that is processed by the obfuscation program code 110 and/or may contain obfuscated executable code 60 generated based on an output of the obfuscation program code 110. The code obscuring computer 100 may further include a network interface 1420 configured to communicate with other computers and/or a source code data storage device (e.g., network server) through a data network. The code obscuring computer 100 may further include a display device 1430 and a user input interface 1440.

The processor circuit 1400 may include one or more data processing circuits, such as a general purpose and/or special purpose processor, e.g., microprocessor and/or digital signal processor. The processor circuit 1400 is configured to execute the obfuscation program code 110 in the memory circuit 1410 to perform at least some of the operations described herein as being performed by a code obscuring computer.

Figure 15:
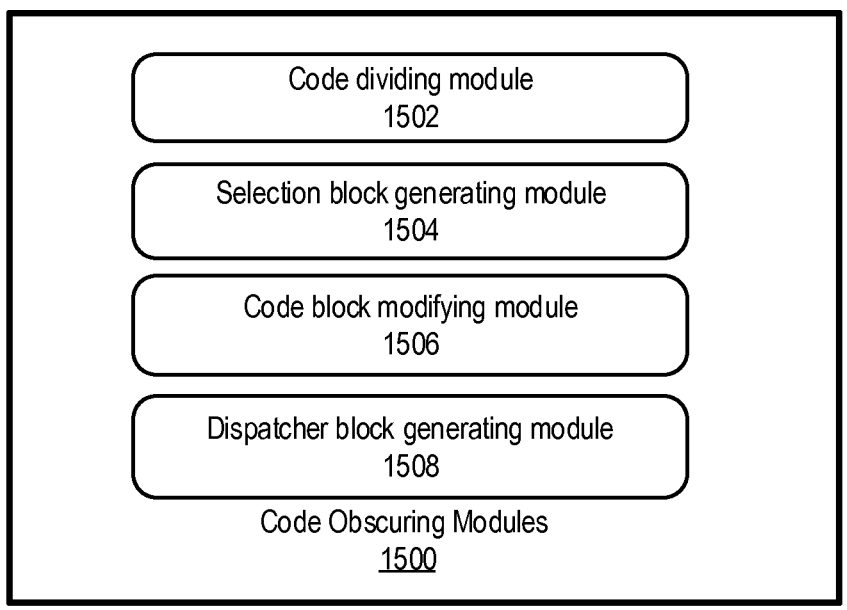
FIG. 15 illustrates code obscuring modules for a code obscuring computer that obscure a control execution flow through code blocks of a computer program configured in accordance with some embodiments.

FIG. 15 illustrates code obscuring modules 1500 for a code obscuring computer 100 that obscure a control execution flow through a plurality of code blocks of a computer program. The modules 1500 include a code dividing module 1502, a selection block generating module 1504, a code block modifying module 1506, and a dispatcher block generating module 1508. The code dividing module 1502 is configured for performing code dividing operations of block 302 of FIG. 10. The selection block generating module 1504 is configured to generate a selection block according to the operations of block 304 of FIG. 10. The code block modifying module 1506 is configured to modify the code blocks of the computer program according to block 306 of FIG. 10, and the dispatcher block generating module 1508 is configured to provide the state update function according to block 308 of FIG. 10 and to provide the dispatcher block according to block 310 of FIG. 10.

Figure 16:
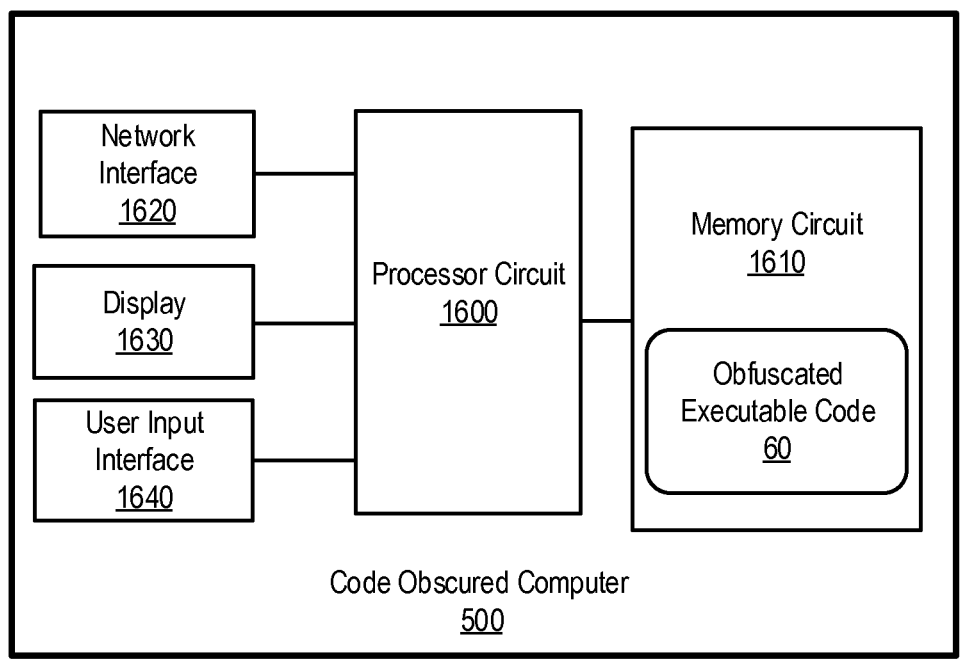
FIG. 16 is a block diagram of a code obscured computer configured to perform operations in accordance with some embodiments.

FIG. 16 is a block diagram of a computer 500 with obfuscated code configured to perform operations according to one or more embodiments disclosed herein. The computer 500 is programmed to execute the obfuscated executable code 60 generated by a code obscuring computer 100.

The computer 500 includes a processor circuit 1600 and a memory circuit 1610 containing obfuscated executable program code 60. The computer 500 may further include a network interface 1620 configured to communicate with other computers and/or a source code data storage device (e.g., network server) through a data network. The computer 500 may further include a display device 1630 and a user input interface 1640.

The processor circuit 1600 may include one or more data processing circuits, such as a general purpose and/or special purpose processor, e.g., microprocessor and/or digital signal processor. The processor circuit 1600 is configured to execute the obfuscated program code 60 in the memory circuit 1610 to perform at least some of the operations described herein as being performed by a computer programmed with obfuscated executable code.

Figure 17:
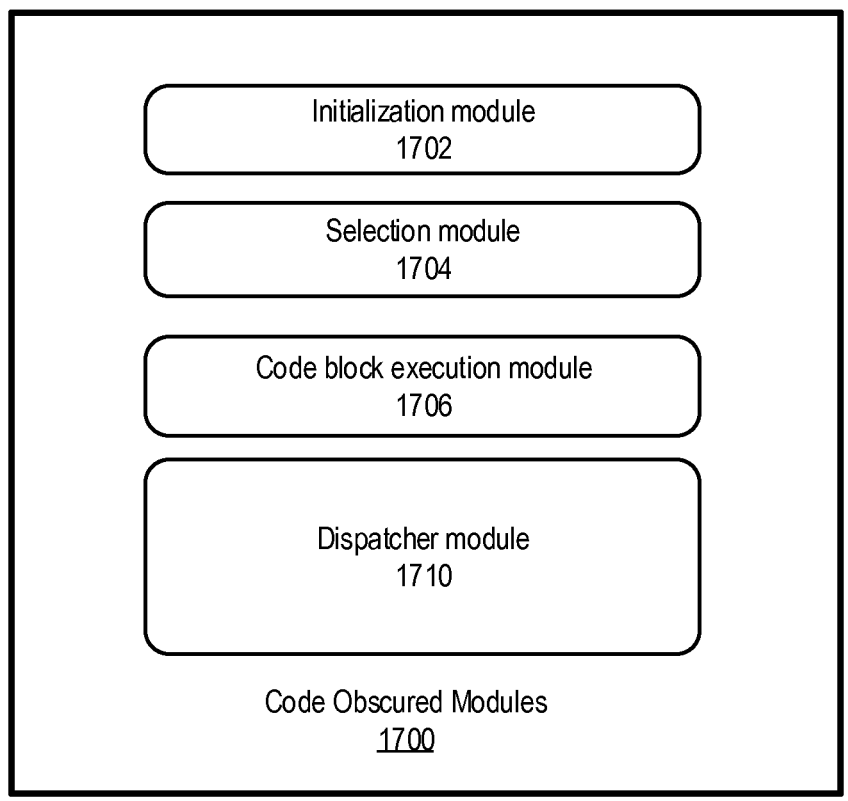
FIG. 17 illustrates code obscured modules for a code obscured computer that obscure a control execution flow of a computer program in accordance with some embodiments.

FIG. 17 illustrates code obscuring modules 1700 for a code obscured computer 500 that have obscured control execution flow through a plurality of code blocks. The modules 1700 include an initialization module 1702, a selection module 1704, a code block execution module 1706, a state variable updating module 1708, and a dispatcher module 1510. The initialization module 1702 is configured to perform initialization according to the operations of block 322 of FIG. 11. The selection module 1704 is configured to select a code block for execution according to the operations of block 324 of FIG. 11. The code block execution module 1706 is configured to execute the selected code block according to the operations of block 326 of FIG. 11. The state variable updating module 1708 is configured to update the state variable according to the operations of block 328 of FIG. 11, and the dispatcher module 1510 is configured to update the switching variable according to the operations of block 330 of FIG. 11.

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

LISTING OF DOCUMENTS REFERENCED ABOVE WITHIN BRACKETS [ ]

1. C. Wang, J. Hill, J. Knight, and J. Davidson. Software tamper resistance: Obstructing static analysis of programs. Technical report, Charlottesville, Va., USA, 2000.
2. S. Chow, Y. Gu, H. Johnson, and V. A. Zakharov. An Approach to the Obfuscation of Control-Flow of Sequential Computer Programs, pages 144{155. Springer Berlin Heidelberg, Berlin, Heidelberg, 2001.
3. T. Laszlo and A. Kiss. Obfuscating C++ programs via control flow flattening. Annales Univ. Sci. Budapest, pages 3-19, 2009.
4. J. Cappaert and B. Preneel. A general model for hiding control flow. In Proceedings of the Tenth Annual ACM Workshop on Digital Rights Management, DRM '10, pages 35-42, New York, N.Y., USA, 2010. ACM.
5. P. Junod, J. Rinaldini, J. Wehrli, and J. Michielin.Obfuscator-LLVM—software protection for the masses. In B. Wyseur, editor, Proceedings of the IEEE/ACM 1st International Workshop on Software Protection, SPRO'15, Firenze, Italy, May 19, 2015, pages 3-9. IEEE, 2015.
6. B. Johansson, P. Lantz, M. Liljenstam: WO2018/050335A1.
7. A. Klimov; A. Shamir (2002). "A New Class of Invertible Mappings," CHES'02, pages 470-483. Springer Berlin Heidelberg, 2003.

The invention claimed is:

1. A method by a computer to obscure a control execution flow of a computer program, the method comprising:
   initializing a state variable, q, and a switching variable, swVar;
   selecting a code block for execution from among a set of code blocks of the computer program using a present value of the switching variable;
   executing the selected code block;
   updating the state variable based on a present value of the state variable and a block-dependent constant, a_i, that is associated with the code block to generate an updated state variable, and by applying a state update function, g(q), to the updated state variable;
   updating the switching variable by applying an output function, f(q), to the state variable, wherein the output function comprises a non-injective function that generates a value of the switching variable based on the state variable, and wherein each value in a domain of the switching variable is associated with a plurality of pre-images in a domain of the state variable; and
   repeating the operations of selecting a code block, executing the selected code block, updating the state variable and updating the switching variable to control execution flow through at least a plurality of code blocks among the set of code blocks.

2. The method of claim 1, wherein updating the state variable comprises operating on the block-dependent constant and the state variable using at least one of an addition operation and an exclusive-or operation.

3. The method of claim 2, wherein the state update function comprises a single multiplication according to $g(\{q1|q2\})=\{q1*q2|q2\}$ where "*" denotes modulo-$2^n$ multiplication and n is the number of bits in q1 and in q2.

4. The method of claim 1, wherein the state variable q comprises a composite variable $\{q1|q2\}$, wherein "|" denotes concatenation, and wherein the state update function comprises an arithmetic operation on the state variables q1 and q2.

5. The method of claim 4, wherein the output function is according to $f(\{q1|q2\})=q1 »(n-m)$, wherein "»" denotes a bitwise right shift operation, n represents a number of bits in the state variable q1, and m represents a number of bits in the switching variable.

6. The method of claim 1, wherein the state update function comprises a Klimov-Shamir T-function.

7. The method of claim 6, wherein the state variable q comprises a composite variable $\{q1|q2\}$, wherein "|" denotes concatenation, and, wherein the state update function is according to $g(\{q1|q2\})=\{q1+q1^2 \text{ OR } q2|q2\}$, where all operations are modulo-$2^n$ multiplication and n is the number of bits in q1 and in q2.

8. The method of claim 7, wherein the output function is according to $f(\{q1|q2\})=q1»(n-m)$, wherein "»" denotes a bitwise right shift operation, n represents a number of bits in the state variable q1, and m represents a number of bits in the switching variable.

9. The method of claim 1, wherein applying the state update function comprises applying a single round of an advanced encryption standard, AES, algorithm using the state variable as both a key and a plain text input to the AES algorithm according to g(q)=one_round_aes(k,p), where k and p are functions of q.

10. The method of claim 1, wherein applying the state update function comprises applying a state update function of a stream cipher to the state variable, and wherein applying the output function comprises applying an output function of the stream cipher to the state variable.

11. A computer program product comprising a non-transitory computer readable medium storing program code that when executed by a processor of a computer causes the computer to perform the method of claim 1.

12. A computer executing a computer program, the computer comprising:
at least one processor; and
at least one memory coupled to the at least one processor and storing program code that when executed by the at least one processor causes the at least one processor to perform operations comprising:
initializing a state variable, q, and a switching variable, swVar;
selecting a code block for execution from among a set of code blocks of the computer program using a present value of the switching variable;
executing the selected code block;
updating the state variable based on a present value of the state variable and a block-dependent constant, a_i, that is associated with the code block to generate an updated state variable, and by applying a state update function, g(q), to the updated state variable;
updating the switching variable by processing the state variable through an output function, wherein the output function comprises a non-injective function that generates a new value of the switching variable based on the state variable, and wherein each value in a domain of the switching variable is associated with a plurality of pre-images in a domain of the state variable; and
repeating the operations of selecting a code block, executing the selected code block, updating the state variable and updating the switching variable to control execution flow through at least a plurality of code blocks among the set of code blocks.

13. A method by a code obscuring computer to obscure a control execution flow through a computer program, the method comprising:
dividing a functional portion of the computer program into a set of code blocks;
providing an initialization block that initializes a value of a switching variable, swVar, and a state variable, q;
providing a selection block that selects a code block for execution from among the set of code blocks using a present value of the switching variable, swVar;
modifying at least one of the code blocks to update the state variable, q, based on a present value of the state variable and a block-dependent constant, a_i, that is associated with the code block;
providing a state update function, g(q), that updates the state variable to provide an updated state variable; and
providing a dispatcher block that is configured to receive control from each of the plurality of code blocks, wherein the dispatcher block is configured to update the switching variable by applying an output function, f(q), to the updated state variable, wherein the output function comprises a non-injective function that generates a value of the switching variable based on the updated state variable, and wherein each value in a domain of the switching variable is associated with a plurality of pre-images in a domain of the state variable, and wherein the dispatcher block is configured to transfer control to the selection block.

14. The method of claim 13, wherein each of the code blocks may end with, but does not otherwise contain, a transfer of control statement.

15. The method of claim 13, wherein the state update function is provided within the dispatcher block.

16. The method of claim 13, wherein the state variable q comprises a composite variable {q1|q2}, wherein "|" denotes concatenation, and wherein the state update function comprises an arithmetic operation on the state variables.

17. The method of claim 16, wherein the state update function comprises a single multiplication according to g({q1|q2})={q1*q2|q2}, where "*" denotes modulo-$2^n$ multiplication and n is the number of bits in q1 and in q2.

18. The method of claim 17, wherein the output function is according to f({q1|q2})=q1 »(n−m), wherein "»" denotes a bitwise right shift operation, n represents a number of bits in the state variable, and m represents a number of bits in the switching variable.

19. The method of claim 13, wherein the state update function comprises a Klimov-Shamir T-function.

20. The method of claim 19, wherein the state variable q comprises a composite variable {q1|q2}, wherein "|" denotes concatenation, and, wherein the state update function is according to g({q1|q2})={q1+q1$^2$ OR q2|q2}, where all operations are modulo-$2^n$ multiplication and n is the number of bits in q1 and in q2.

21. A computer program product comprising a non-transitory computer readable medium storing program code that when executed by a processor of a computer causes the computer to perform the method of claim 13.

22. A code obscuring computer comprising:
at least one processor; and
at least one memory coupled to the at least one processor and storing program code that when executed by the at least one processor causes the at least one processor to perform method of claim 13.

* * * * *